(12) United States Patent
Zou et al.

(10) Patent No.: US 8,392,357 B1
(45) Date of Patent: Mar. 5, 2013

(54) TRUST NETWORK TO REDUCE E-MAIL SPAM

(75) Inventors: Fei Zou, Jiang Su (CN); Jianxin Guo, Jiang Su (CN)

(73) Assignee: Trend Micro, Inc., Tokyo (JP)

( * ) Notice: Subject to any disclaimer, the term of this patent is extended or adjusted under 35 U.S.C. 154(b) by 306 days.

(21) Appl. No.: 12/262,441

(22) Filed: Oct. 31, 2008

(51) Int. Cl.
*G06F 7/00* (2006.01)
*G06F 17/00* (2006.01)

(52) U.S. Cl. ......... 707/602; 707/770; 709/206; 715/752

(58) Field of Classification Search .......... 707/600–831; 709/203, 204, 206, 207, 229; 726/3, 13, 726/22; 715/752
See application file for complete search history.

(56) References Cited

U.S. PATENT DOCUMENTS

| | | | |
|---|---|---|---|
| 6,321,267 B1 * | 11/2001 | Donaldson | 709/229 |
| 7,099,853 B1 * | 8/2006 | Liu et al. | 706/45 |
| 7,219,131 B2 * | 5/2007 | Banister et al. | 709/206 |
| 7,653,695 B2 * | 1/2010 | Flury et al. | 709/206 |
| 7,711,669 B1 * | 5/2010 | Liu et al. | 706/45 |
| 7,873,996 B1 * | 1/2011 | Emigh et al. | 726/22 |
| 2010/0174793 A1 * | 7/2010 | Wieneke et al. | 709/206 |

OTHER PUBLICATIONS

Zoltán Gyöngyi et al., Combating web spam with trustrank, 2044, ACM, vol. 30, 576-587.*

* cited by examiner

*Primary Examiner* — Jean B Fleurantin
(74) *Attorney, Agent, or Firm* — Beyer Law Group LLP

(57) ABSTRACT

A trust network database has any number of nodes, each node representing a user e-mail address. Links between nodes represent whether one user trusts another. Trust (that the recipient is trusted) is established when a sender sends an e-mail message to a recipient. The recipient is effectively placed on the white list for the sender. A legitimate e-mail address creates a strong trust link, otherwise it is weak. A spam count tracks by an amount of spam sent by each node. Outgoing e-mail messages are screened to make a determination that the sender trusts the recipient and that information is added to a local or remote trust network. Incoming e-mail messages are first screened to determine that the sender is legitimate. Then, the sender and recipient e-mail addresses are forwarded to the trust network to make a determination as to whether the recipient trusts the sender. A score (based upon number and type of links into or out of a node, the spam count for the node, etc.) for the sender is returned indicating whether or not the e-mail message is likely to be spam. An anti-spam engine is bypassed, used normally, or used aggressively based upon the score.

26 Claims, 7 Drawing Sheets

Global Trust Network Service

Trust Network

| Sender Node | Recipient Node | Trust | Two-Way? | Spam Count | |
|---|---|---|---|---|---|
| A | B | strong | True | 0 | |
| B | A | strong | True | 0 | |
| S3 | A | weak | False | 1 | |
| ⋮ | ⋮ | ⋮ | | | |

Node Table

TRUST NETWORK TO REDUCE E-MAIL SPAM

FIELD OF THE INVENTION

The present invention relates generally to identifying electronic mail spam. More specifically, the present invention reduces such spam using a sender-recipient trust network.

BACKGROUND OF THE INVENTION

Spamming is the abuse of electronic messaging systems to indiscriminately send unsolicited bulk messages, and the most widely recognized form of spam is e-mail spam, also known as junk e-mail, junk messages, etc. Spamming is economically viable because advertisers have no operating costs beyond the management of their mailing lists, and it is difficult to hold senders accountable for their mass mailings. Because the barrier to entry is so low, spammers are numerous, and the volume of unsolicited mail has become very high. The costs, such as lost productivity and fraud, are borne by the public and by Internet service providers, which have been forced to add extra capacity to cope with the deluge. Persons who create electronic spam are called spammers.

In particular, e-mail spam—also known as unsolicited bulk e-mail (UBE) or unsolicited commercial e-mail (UCE)—is the practice of sending unwanted e-mail messages, frequently with commercial content, in large quantities to an indiscriminate set of recipients. Spam in e-mail started to become a problem when the Internet was opened up to the general public in the mid-1990s. It grew exponentially over the following years, and today comprises some 80 to 85% of all the e-mail in the world. Pressure to make e-mail spam illegal has been successful in some jurisdictions, but less so in others. Spammers take advantage of this fact, and frequently outsource parts of their operations to countries where spamming will not get them into legal trouble.

Increasingly, e-mail spam today is sent via "zombie networks," networks of virus- or worm-infected personal computers in homes and offices around the globe; many modern worms install a backdoor which allows the spammer access to the computer to use it for malicious purposes. This technique complicates attempts to control the spread of spam, as in many cases the spam does not originate from the spammer. E-mail is an extremely cheap mass medium, and professional spammers have automated their processes to the extent that millions of messages can be sent daily with little or no labor costs. Thus, spamming can be very profitable even at what would otherwise be considered extremely low response rates.

Currently, anti-spam products are mostly based on blacklist technology. An ISP or domain reputation service will build up a blacklist of spam senders. For example, a DNS blacklist is a means by which an Internet site publishes a list of IP addresses of known spammers (that legitimate users may want to avoid) in a format which can be easily queried by computer programs on the Internet. The technology is built on top of the Internet Domain Name System, or DNS. These blacklists are used to publish lists of addresses linked to spamming. Most mail transport agent (mail server) software can be configured to reject or flag messages which have been sent from a site listed on one or more such lists. In addition, a right-hand side blacklist is similar to a DNS blacklist but it lists domain names rather than IP addresses.

A signature technology may also be used by an anti-spam product and it uses a spam e-mail sample to extract a signature. Incoming messages are compared to the signature. The technique is not perfect; false positives may delete legitimate e-mail, and false negatives may flood an in box with spam.

For these current anti-spam products, it can be difficult to handle a new threat. A blacklist will not list new addresses or domain names used by a spammer. New e-mail formats and content can evade signature algorithms. Further, a domain reputation service cannot blacklist the reputation of an entire ISP, such as Yahoo or Gmail. If a spammer uses such an ISP mail account to send spam, the reputation technology will not block this spam. Another challenge is that everyone has a different idea about what is and is not spam; a given e-mail message will be spam for one person, yet will be legitimate e-mail for another.

Some anti-spam products use an IP-based reputation technique to check the e-mail sender's mail transfer agent (MTA). Some venders, such as IronPort and Gmail use a domain-based reputation technique to check if the e-mail sender's MTA is valid. These reputation techniques only check the e-mail sender's MTA, but, even if a domain name or IP address is valid, spam e-mail may still originate from that location. In other words, a spammer may use an ISP to send spam.

It is thus difficult to validate a legitimate e-mail sender with the current anti-spam products. And, it is also difficult to build up a comprehensive and accurate sender white list using currently available techniques. A technique and system are thus desired to reduce e-mail spam.

SUMMARY OF THE INVENTION

To achieve the foregoing, and in accordance with the purpose of the present invention, a global trust network and local trust network are disclosed that enable a system to determine if a sender is on a white list for a recipient.

The present invention provides an "in-the-cloud" technique to reduce spam by building a global sender-recipient trust network. Normally, an e-mail sender will only send messages to, reply to messages from, and forward messages to, his friends (or other known and trusted entities). This information can be used to build a trust network, and this trust network can be used to reduce e-mail spam. Such a technique can reduce false positives and increase processing performance.

Once such a trust network is built for a sender and recipient pair, we can judge if the sender sending e-mail to the recipient is legitimate. Such a check is better for reputation checking. And because the trust network is based on the sender, it is possible to produce a white list for spam checking. Mail scanning performance is increased because messages that are determined to be definitely spam or definitely not spam, need not be scanned by an anti-spam engine. Further, messages that are likely to be spam by scanned more aggressively by the anti-spam engine thus increasing the detection rate.

In one embodiment, a method determines if an incoming e-mail message is spam by sending the sender e-mail address to the global trust network database, determining if the sender can be trusted, receiving a score indicating a likelihood that the message is spam, and then deciding whether or not to deliver the message, mark it as spam, or use an anti-spam engine to scan the incoming message.

In a second embodiment, a method updates a trust network database based upon an outgoing message that a sender is desiring to send to a recipient. Because the message emanates from within the computer system, it is assumed that the sender is legitimate. Both of the sender e-mail address and the recipient e-mail address are forwarded to the trust network database and a trust link is established from the sender to recipient, thus effectively placing the recipient on the sender white list. The trust network database may be local or remote.

In a third embodiment, a method updates a trust network database based upon an incoming message that a sender desires to send to a recipient at the local computer system. First, the sender is authenticated to make sure that the sender e-mail address is legitimate. It is then determined that the sender is on the white list of the recipient. Next, both the sender e-mail address and the recipient e-mail address are forwarded to the trust network database and a trust link is established from the sender to recipient, thus effectively placing the recipient on the sender white list. The trust network database may be local or remote. A determination may be made that the sender is on the white list of the recipient by accessing a global trust network database according to the first embodiment.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Normally, an e-mail message sender only sends messages, forwards messages or replies to messages to his friends. Thus, if a sender sends or replies to recipients, it can be said that the recipients are trusted by the sender. Further, in an enterprise environment it can be determined that outgoing e-mail messages are always authenticated as coming from legitimate senders. Upon collection of all of this trust information, a global trust network for senders and recipient can be built. Any suitable e-mail MTA or e-mail program (or any anti-spam product) operating on a user computer or within an enterprise provides feedback to the in-the-cloud global trust network. Then, using that trust network it can be judged if A trusts B; if so, then B is permitted to send e-mail messages to A. In this sense, the trust network functions as a white list technology.

Terminology may be defined as follows. If A sends mail to B, we say that A trusts B. likewise, if B sends mail to A, we say that B trusts A. Thus, if A trusts B, and B trusts A, then we determine it is a two-way trust. On the other hand, if A trust B, but B does not trust A, then we determine that it is a one-way trust. Each of these one-way or two-way trusts may be weak or strong. If the sender has not been determined to be legitimate by passing a mail authentication protocol, then the trust is weak. But, if the sender has passed mail authentication, then the trust is strong. Preferably, in a two-way trust the both sender and receiver must be authenticated as legitimate before the two-way trust is considered strong.

Using these definitions, the following general rules may be defined. If A has many one-way weak trust relationships with others it is highly probable that A is a spammer. If A and B have a strong two-way trust, then both of these parties will be on each other's white list. If A trusts B, and B trusts C, then A trusts C. Further if A sends mail to B, but it is a weak trust (because A is not authenticated), B will be on A's white list. Alternatively, an embodiment may be implemented where only a strong trust would place B on A's white list.

System Architecture

Figure 1A:
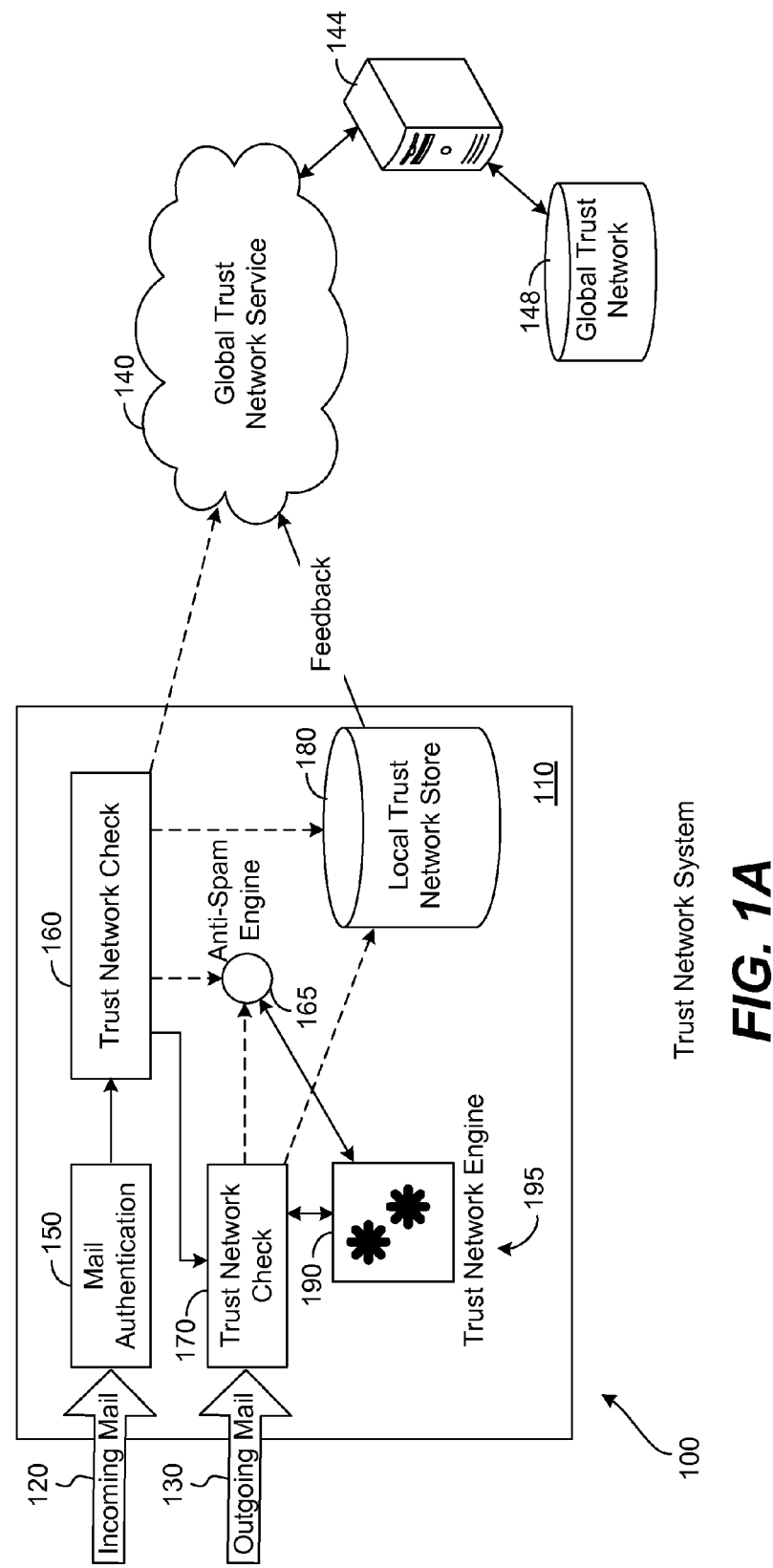
FIG. 1A is a block diagram illustrating an anti-spam trust network system.

FIG. 1A is a block diagram illustrating an anti-spam trust network system 100. This figure illustrates implementation of the invention within an enterprise; the invention may also be implemented within a local area network or on a user computer as will be apparent to those of skill in the art. The figure illustrates an e-mail message coming into the organization and how it is processed, and also how an outgoing e-mail message is handled. In general, the present invention has two aspects: how e-mail message handling is used to build up the global trust network and store this trust network at an Internet-based service, and how an incoming mail message is processed to determine whether or not it is spam.

As shown, the anti-spam trust network system 100 is partially implemented within an enterprise environment 110. The enterprise, such as a company, organization or government body, includes any of a number of computers, servers and local or wide area networks. The below-described systems, databases, engines and products may be implemented across any of a number of hardware devices within the enterprise, or may be implemented upon a single computing device. For implementation on a single computer for a user, the below-described modules are implemented on a single computer.

Shown here is an incoming e-mail message 120 sent from Alice outside the enterprise to Bob within the enterprise. Also shown is an outgoing e-mail message 130 sent by Bob to someone outside of the enterprise. This outgoing message 130 originates with Bob's e-mail client program and is first processed or screened by module 170 before being sent to the local mail transfer agent for delivery to the intended recipient. There are various components within an enterprise implementation 110 that form part of the overall system 100: a mail authentication module 150, a trust network check module 160, an anti-spam product 165, a trust network collector module 170, a local trust network store 180, and a trust network engine 190. Within this implementation, components 150, 160, 170, 180 and 190 form an enterprise trust network software product 195 that is used in conjunction with a traditional anti-spam engine 165 and which connects over the Internet to network service 140. Alternatively, trust network product 195 may be part of anti-spam product 165 (or vice versa), or both products may be combined into a single product that performs the functionality shown.

Anti-spam engine 165 is any suitable anti-spam software product (whether standalone or integrated with other antivirus software) that scans incoming e-mail messages to determine whether they are spam or not. Techniques used may include signature scanning, use of heuristics, pattern matching, blacklists, white lists, identification of IP addresses and domain names, etc. In one particular embodiment, an anti-spam software product available from Trend Micro Inc. of Cupertino, Calif. is used. The product "Spam Prevention Solution" blocks e-mail spam and phishing attacks using three tiers of anti-spam protection. An e-mail reputation analysis uses a reputation service to judge the reputation of an e-mail message; an IP address profiler provides a customer-specific reputation service and a firewall against directory harvest attacks and bounced mail attacks. The product also uses heuristics to route suspicious messages into a spam quarantine folder, to enable the user to create approved and blocked sender lists. A security setting may be set to low, medium or high. As is the case with any security program, the higher the security, the more false positives one can expect to encounter.

In traditional operation, an incoming e-mail message 120 is received by a mail transfer agent, any suitable e-mail program, or even by anti-spam product 165. Under the present invention, message 120 is first processed by mail authentication module 150 before it is scanned by the anti-spam product and delivered to the end user. When the message arrives at authentication module 150, the mail authentication module authenticates if the mail sender is a legitimate user. For a legitimate sender, a strong one-way trust link will be constructed from the sender to the receiver, for an illegitimate or unknown sender, a weak trust link will be constructed.

After mail authentication, the trust network check module 160 accesses global trust network service 140 to determine the sender/recipient trust relationship in order to determine if the mail is spam. The trust network check module will provide feedback to and/or utilize the anti-spam product 165 for more possibly more checking or to take action if the message is spam.

Trust network collector module 170 collects the mail trust information retrieved from the network service 140 and uses the trust network engine 190 to store this information to local trust network store 180. Collector module 170 also collects mail trust information gleaned from message 120 and from outgoing mail message 130 and stores this in the local store 180. Trust network engine 190 is a software module that manages the other modules of implementation 110 and coordinates interaction with anti-spam engine 165, and is also responsible for the maintenance of local trust network store 180, and for providing local information as feedback to the global trust network service 140. The logic used by engine 190 depends upon the particular implementation (such as a stand-alone computer or an enterprise). For example, considering an enterprise gateway product implementation, the engine may update the local store to add a weak trust between the sender and recipient if the incoming message is not spam (and the sender is not authenticated). Outgoing messages will be stored as a strong trust link between the sender and recipient. If the recipient is replying to a message from the sender, then the trust from the sender to recipient will be changed to a strong trust, and a strong trust link will be added from the recipient to the sender. Local trust network store 180 is any suitable database, file system, file, array, or other type of massive storage able to store the trust network as described below.

Global trust network service 140 is a service that stores the global trust network, receives feedback from each implementation (whether within an enterprise or on a user computer), and provides access to the global trust network for each implementation (i.e., trust network product 195). In general, this network service 140 collects feedback information from all of the product implementations (e.g., from all end-user computers within an organization, from all local sites of a distributed enterprise, from all implementations within a particular country, or from all enterprise and implementations from around the world) and then uses backend data mining logic to build the global trust network that will in turn be used by each product implementation to judge whether an incoming e-mail message is spam or not. By accessing the global trust network, the service can make a determination if the sender is on the white list for the recipient (i.e., the recipient trusts the sender). Also, a blacklist can be determined by analyzing each node (amount of spam sent from each node, number of weak trust links emanating from each node, etc.). In addition to a blacklist for each node (i.e., for each e-mail address), a particular domain having the most spammers can also be put down on a blacklist. In one implementation, network service 140 is implemented on a server computer 144 accessible over the Internet that uses a database 148 to store the global trust network.

Figure 1B:
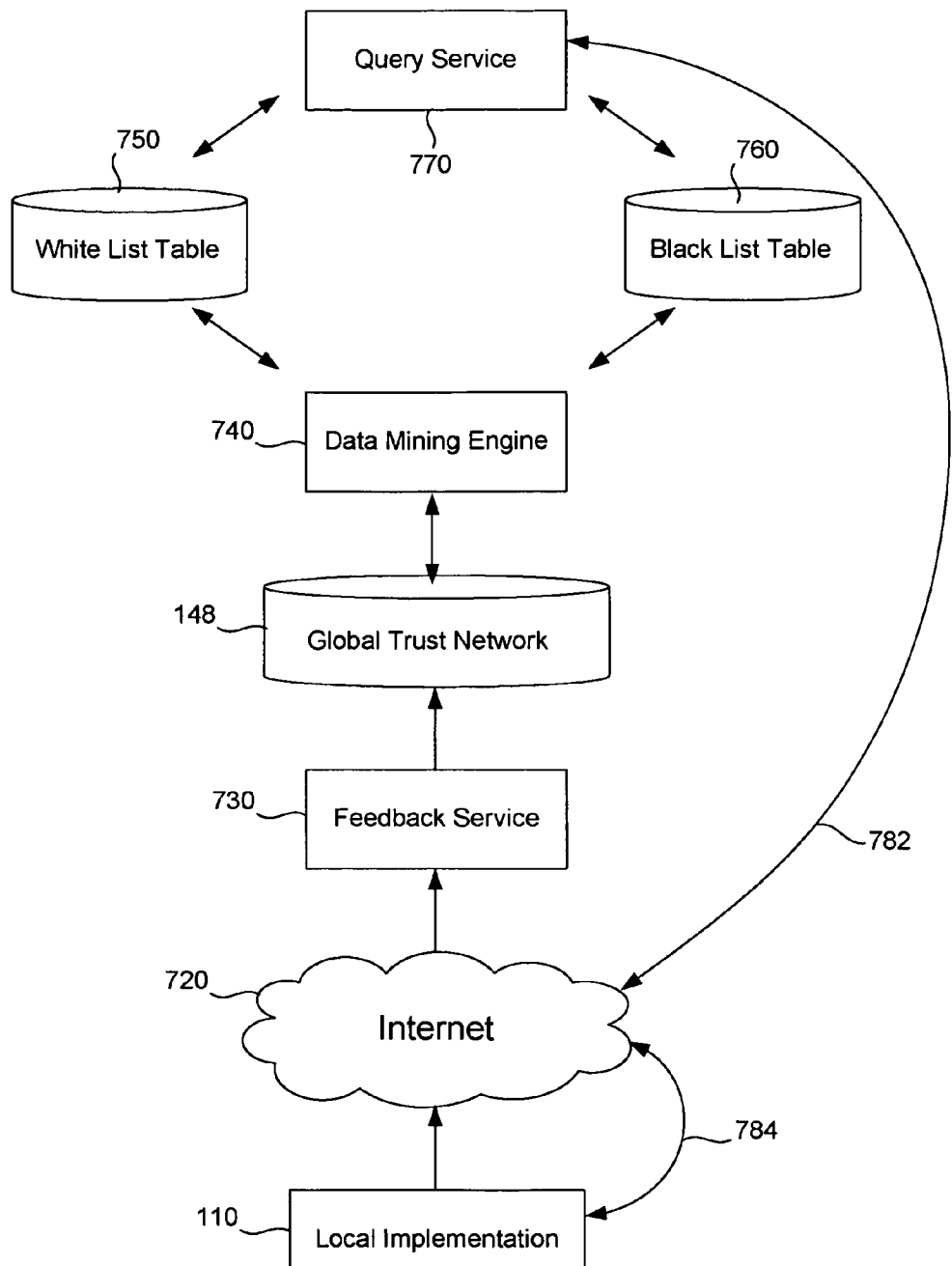
FIG. 1B is a block diagram illustrating one embodiment of a global trust network service.

FIG. 1B illustrates one embodiment of a global trust network service 700 that may be used in the trust network system 100 of FIG. 1A. Local implementation 110 is any suitable local implementation on a computer or computers such as that shown in the FIG. 1A. The local implementation provides feedback over the Internet to a feedback service 730 of the global trust network service that includes information from a local trust network store 180. The feedback service 730 is any suitable software module running on a computer that takes the local data and updates the global data in the global trust network database 148. For example, any data in a local trust network 200 or a local node table 202 is taken and used to update a global trust network or a global node table within database 148. In this manner, a global trust network or a global node table is implemented in a similar manner as (and resembles) trust network 200 or node table 202.

A data mining engine software module 740 (also known as a "crawler") reviews data in database 148 and uses that information to create (or update) a white list table 750 or a blacklist table 760. A white list table is simply a collection of sets of data, each set of data indicating for a certain user of the system, which other users are permitted to send that user electronic mail. For example, if a certain user has sent e-mail messages to 100 people (and a strong trust is established), then each of those 100 people will be on the white list for that certain user. A white list may be implemented in different manners and have different criteria using any of the information found in a trust network or node table; the actual definition of what constitutes a white list for a particular user will depend upon the implementation of the global trust network service.

A blacklist, by contrast, is a list of users that are not permitted to send electronic mail to a particular user. Blacklist table 760, thus includes sets of blacklists for all users of the system. The definition of a blacklist for a particular user will depend upon implementation of the global trust network service. In one embodiment, a user who has sent spam to a particular user will automatically be placed on the blacklist for that particular user. Alternatively, table 760 may be a traditional blacklist that simply is an exhaustive list of all known spammers (and other undesirable e-mail addresses and domains) that are not permitted to send electronic mail to any user.

Both the white list table and blacklist table are thus available to be queried by any local implementation via query service 770. The query service accepts queries over Internet links 782 and 784 and responds to the local implementation with a determination as to whether a particular sender is allowed to send e-mail to a particular user. Alternatively, query service 770 may bypass both the white list and blacklist table and query the global trust network database 148 directly by performing a direct search through the information of that database. This direct search uses trust relationships (nonexistent, weak or strong), spam count, type of trust, (and any other information in the database), to determine whether a sender should be allowed to send electronic mail.

Trust Network Examples

Figures 2, 3:
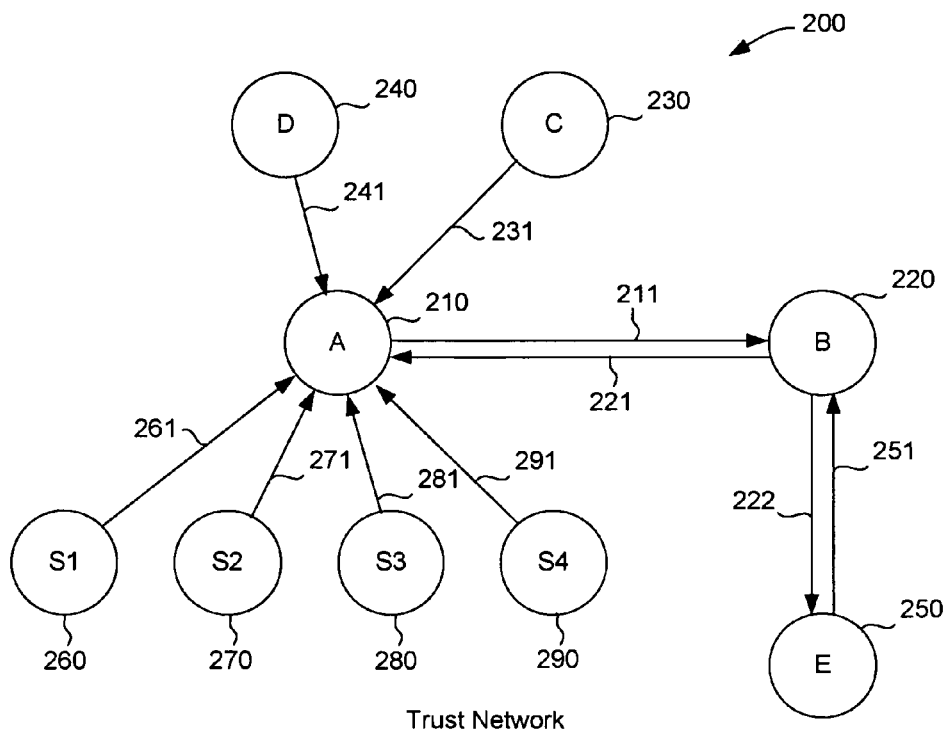
FIG. 2 illustrates graphically a simple trust network.
FIG. 3 illustrates a node table that keeps track of the trust relationships between any of a number of senders and recipients of e-mail messages.

FIG. 2 illustrates graphically a simple trust network 200. In this example each e-mail user in the system is represented by a letter (e.g., A, B, 51, etc), and an arrow pointing from a first user to a second user indicates that the first user has sent an e-mail message to the second user. Here, users are represented by letters, but in actual implementation each user would be represented by their actual e-mail address, e.g., alice@bigco.com. Each user may have any number of unique e-mail addresses.

In this example, nodes 210-250 represent legitimate users, while nodes 260-290 represent suspected spammers. Considering the mail traffic for user A as an example, user A receives messages from B, C, D, and they are all legitimate messages. Thus, links 221, 231 and 241 are all strong trust links (or relationships). A sends a reply message to B, thus, strong link 211 is established and the trust between A and B is a two-way trust. The trust between users B and E is also a strong two-way trust. If the trust between two users is only a weak trust in each direction (they have sent mail to each other, but neither user is authenticated), the trust may still be two-way, but it is a weak trust. Further, if there is weak trust in one direction but a strong trust in the other direction, the trust still be two-way, but again, it is a weak trust.

By contrast, A also receives spam e-mail messages from S1, S2, S3, S4. In this example, S1 and S2 are authenticated as legitimate e-mail addresses, but S3 and S4 e-mail senders have failed mail authentication. Therefore, links 261 and 271 are strong trust links even though the sender has sent spam. These links will never be a two-way trust because the sender should never respond to spam messages. Links 281 and 291 are weak trust links and are shown using dashed lines because authentication has failed. The corresponding trust network 200 is shown graphically and such a graphic representation may be represented in any memory, database or other storage using any suitable representation. Such a graphic representation of a trust network may also be displayed to the end user, system administrator, or engineer for the purpose of identifying spam, identifying spammers, blocking messages, etc. One of skill in the art will be able to generate the graph of FIG. 2 using data from FIG. 3.

Nodes may be colored to indicate the degree to which a node has established a number of weak trust links. For example, a lighter color indicates that a small number of weak trust links have been established, while progressively darker colors indicates that the node (and the sender) has established a greater number of weak trust links (e.g., the sender has sent out many e-mail messages and the sender has not been authenticated in these instances). A weak link counter may also be established for each node indicating how many weak links each node has established. A separate spam counter may also be established for each node that counts how many spam messages a given node has sent out.

Given such a trust network it can be determined that B is in the white list for A because A has established a strong trust link with B (i.e., A has sent a message to B and A has been authenticated). Thus, B will be allowed to send e-mail messages to A (as determined by any suitable e-mail program, anti-spam engine, or the present invention which makes use of this white list). A will be in the white list for B, C, D because these nodes have sent messages to node A. Thus, sender A can send any e-mail messages to them with little or no e-mail scanning. By contrast, nodes S1, S2, S3 and S4 have the potential to be on the blacklist for A because they have sent spam to that node. Also, nodes S3 and S4 have previously faked e-mail addresses; this information will be tracked and checked again in the future.

By building a trust network for all e-mail users of the world (or of a country, geographic region, government, or enterprise), one can assemble a huge network. In this network, each node has a variety of trust links with the other nodes; if a node has sent out spam a count will be kept for that node, and if the node has established many weak links, a count will be kept of those links as well. Alternatively, a count of the weak links need not be maintained in a separate field as that value can be counted from entries in the table. A color of a node in a graphical representation of the table keeps track of both of these counters (for example, a darker color indicates more weak links and more spam). Preferably, there is a separate database or list keeps track of the white list for each node, such as the database shown in FIG. 1B.

FIG. 3 illustrates a node table 202 that keeps track of the trust relationships between any of a number of senders and recipients of e-mail messages. Table 202 may be a data structure separate from network 200 or may be integrated into the data structure used for storing network 200. Of course, other representations for the data in table 202 are also possible. Columns 292 and 293 list identifiers for the sender and recipient nodes, column 294 indicates the type of trust, column 295 indicates if this is a two-way trust, column 296 keeps track of the amount of spam sent from a particular node, and column 297 keeps track of how many messages have been sent from the sender to the recipient, or information such as the last time a node was modified in order to help with purging old data and nodes.

In this example, each row represents a trust relationship established between two users based upon messages that have been sent, replied to or forwarded from one user to another. For example, the first row indicates that sender A (who is a legitimate sender) has sent an e-mail message to recipient B; bus, the trust is strong and it is a two-way trust because the recipient has done likewise. Using this table, the number of weak trust links may be established by scanning each row in counting the weak trust links. Two-way trust links may be determined by noting that both the sender and recipient have sent messages to each other.

Outgoing Message Processing

Figure 4:
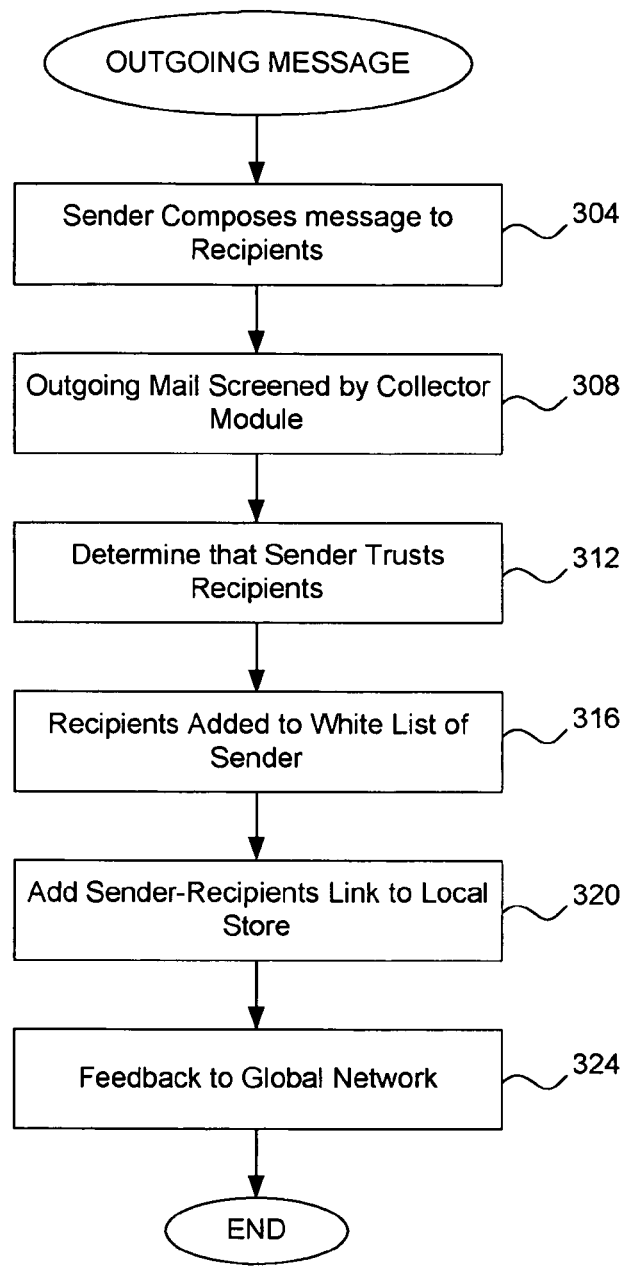
FIG. 4 is a flow diagram describing one embodiment for processing an outgoing e-mail message.
Figure 5:
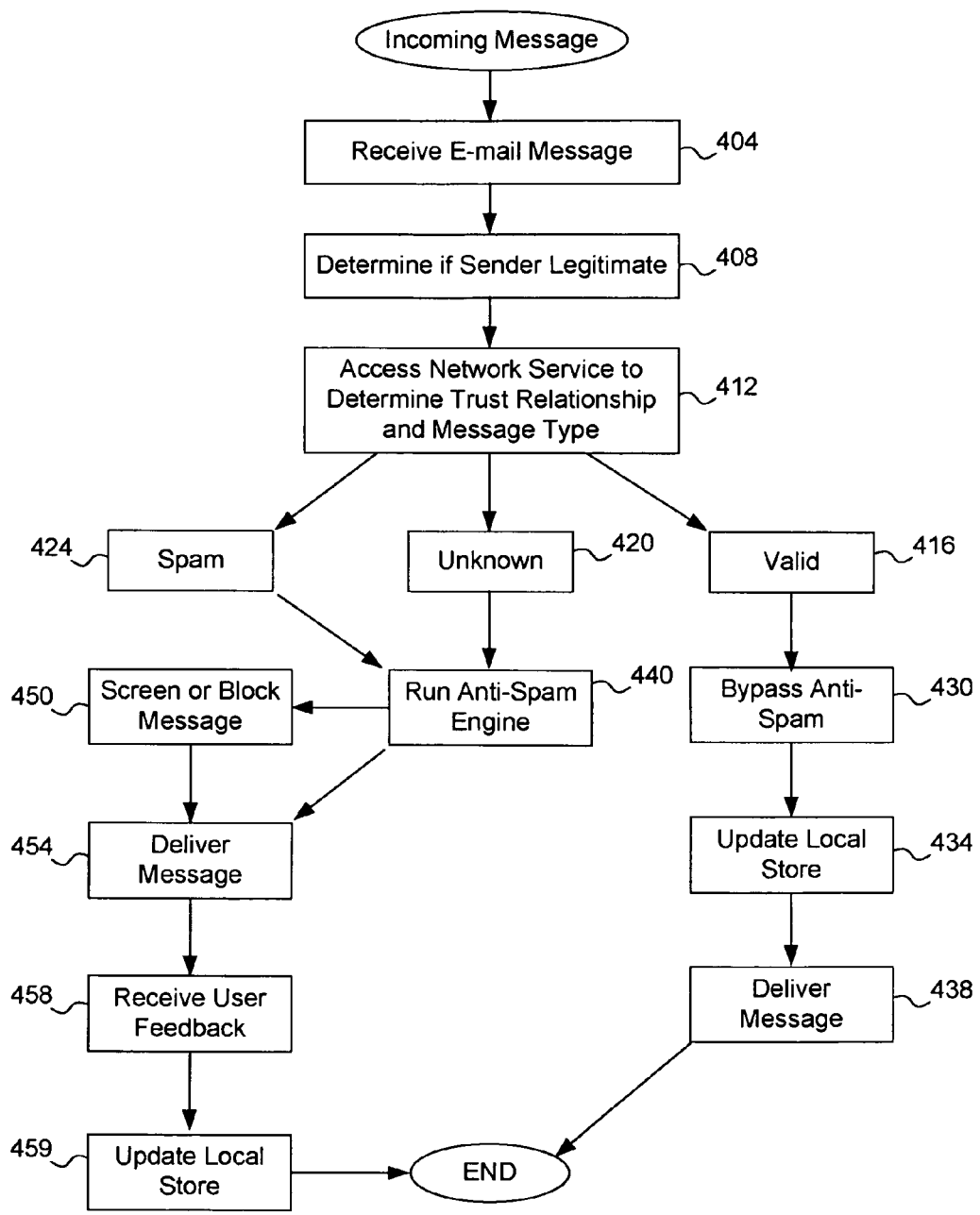
FIG. 5 is a flow diagram describing one embodiment for processing an incoming message.

FIG. 4 is a flow diagram describing one embodiment for processing an outgoing e-mail message. As mentioned above, one aspect of the present invention is the processing of outgoing e-mail messages to not only determine if they are legitimate, but also to determine who is sending to whom, in other words, who trusts whom. The outgoing e-mail message may be processed by an implementation of the present invention on a stand-alone personal computer, by a mail server computer that includes functionality for processing each message, or by an implementation 195 of the present invention within an enterprise 110.

At step 304 a sender composes an e-mail message to any number of recipients. This message may be a new message, a reply to a message from any of the recipients, or a forwarding of a message to a new recipient. The recipients are determined to be those individuals, departments, electronic mailboxes or corporate e-mail addresses (e.g. info@bigco.com) listed in the "To" field, the "Cc" field or the "Bcc" field. In any case, the fact that the sender is sending a message to these entities will be used to make a determination that the sender trusts these entities and at the very least a weak trust link will be established. If the sender can be authenticated as a legitimate sender, then the trust link will be strong. The sender uses any suitable local e-mail client, a browser-based e-mail program (e.g., Gmail), an in-the-cloud e-mail client, an enterprise e-mail program, or similar.

At step 308 the message is sent and this outgoing mail message is screened by trust network collector module 170. Module 170 may perform the screening immediately after the user has clicked "send" and before the message is actually sent, immediately after the message is sent, or anytime thereafter. Module 170 determines to whom the message is being sent (the recipients), who is the sender (identified by an e-mail address) and if the sender is legitimate. In one embodiment, module 170 operating on a stand-alone computer or within an enterprise may be configured to automatically make the determination that the sender is legitimate. Further, module 170 determines if a sender has used auto reply. For example, a user on vacation may set his e-mail account to automatically reply (and thus send a message) to any incoming e-mail message. Or, a spammer may send a spam message that requires an auto reply. The danger is that if an auto reply is sent to a spammer, this is recorded as the sender trusting spammer. Module 170 has the capability to separate normally sent messages from those being sent using auto reply. Preferably, messages sent using auto reply will not result in a trust link being established between the sender and the recipient.

In step 312 it is determined that the sender trusts the recipients (with a strong trust link). In step 316 these recipients may be added to the white list of the sender. In one embodiment, in step 320 this is performed by adding sender-recipient links to the local storage, network store 180. For example, if D send a message to A, this relationship may be stored as illustrated in FIG. 2 using link 241. This link thus establishes that A is on the white list for D. Or, a data structures such as table 202 may be used as a local storage, and a row in a table may be added to indicate the new trust link or links. This information thus helps to establish a white list for the sender which, by virtue of local storage 180, may be accessed by module 160 when an incoming message arrives for the sender. In one embodiment, senders and recipients are identified by their unique e-mail addresses.

Periodically, in step 324 feedback is provided from local storage 180 to the global trust network database 148. The data from either network 200 or table 202 is transferred to a similar global network or global table and that information is updated. Although e-mail addresses may also be used as a representation within the global trust network 148, it is preferable that another representation is used to reduce storage but that still provides a unique identifier for each user. For example, if the users are all from the same domain, only the user name (assuming it is unique) need be stored. Or, the e-mail address is mapped to a unique numerical identifier that takes up less space when represented in binary. Other techniques to compress the e-mail address may be used. In one embodiment, feedback is performed every five minutes. For example, if a link status is updated from weak to strong the local implementation will feed back this information to the global trust network service.

In an alternative embodiment, if a local store is not used, then in step 320 the sender-recipient links are updated by sending the information over a telecommunications network to a remote global trust network 148. In this situation, the feedback of step 324 would not be needed.

Incoming Message Processing

In step 404 an incoming e-mail message is received, for example at the mail authentication module 150. In step 408 mail authentication module 150 determines whether the incoming message is from a legitimate sender or if it is likely that the address of the sender has been faked and the message is actually from a spammer. This step is necessary before accessing the global trust network over the network service because the trust network establishes trust relationships between legitimate senders and recipients. If a spammer were to fake the address of an actual sender, accessing the trust network (or modifying the trust network) using the fake address would incorrectly identify the actual user of that address as a spammer, while the real address of the spammer would not be updated in the trust network. This authentication module may use any of a variety of techniques to verify the domain name, IP address and e-mail address of the sender. For example, the domain name and IP address of an incoming message may be checked using domain key authentication (DK), domain keys identified mail validation (DKIM), a sender policy framework system (SPF), reverse DNS, etc. If the incoming message passes any or all of these checks, then the sender's e-mail address is checked in the message envelope and in the mail header. The sender is authenticated and determined to be legitimate only if the mail address is the same in these locations. Thus, it is determined that an actual user has sent the e-mail message and engine 190 transfers control to check module 160. If the incoming message is not authenticated (in other words, if the message is from a spammer), then a weak trust link will be established between the spammer and the recipient.

It is unlikely that a spammer would be able to fake an e-mail message to pass all of these authentication techniques. If the message passes all of these authentication techniques then the mail transfer agent is presumed to have validated the sender's mail account before relaying the message. Typically, the mail transfer agent is on the recipient's computer. On the other hand, if it is determined that the sender's e-mail address has been faked by a spammer, then the fake e-mail address is not used to access the network service nor is any trust relationship established using the fake address. In this situation, the message (which is likely spam) from the fake e-mail address is sent directly to the anti-spam engine.

If valid, the true address will later be updated in local storage 180 to indicate that a weak trust has been established between the sender and the recipient and a counter is incremented associated with this sender's node in the node table 202 to indicate that another weak trust link has been established. When it is determined that the sender is not legitimate (and is a likely spammer), then the e-mail message is sent directly to anti-spam engine 165 along with a flag or other indication that the message is likely to be spam and that the threshold be increased. In other words, the anti-spam engine is directed to use a more aggressive algorithm for detecting spam which is more likely to indicate that the message is spam.

In step 412, assuming the sender is legitimate, check module 160 receives the incoming e-mail message from module 150. Preferably, the system stores the e-mail message in an accessible location in memory for all modules to access for performance reasons. Alternatively, the e-mail message (or simply the sender and recipient) may be passed from module to module.

In order to determine the trust relationship between the sender and the recipient and the likely message type, check module 160 accesses network service 140 over a network connection (such as the Internet) and passes sender and recipient e-mail addresses. In a variation, only the sender e-mail address need be sent if the trust relationship will be based only upon the sender e-mail address (i.e., any spam count, number of outgoing weak links, etc.). Preferably, though, both addresses are passed.

These two addresses are then passed to server computer 144 which checks these e-mail addresses against the global trust network 148 in order to determine the trust relationship between the sender and recipient (in other words, to determine if the sender shall be allowed to send a message to the recipients). Using a global trust network (such as the example network 200 or the representation of the network in a table 202), computer 144 can determine the type of trust between the two parties (e.g., nonexistent: the recipient has never sent a message to the sender, meaning that the sender is not on the recipient's white list; weak trust: the recipient has sent a message to the sender but was not authenticated; or strong trust: the recipient was authenticated when previously sending a message to the sender, meaning that the sender is on the recipient's white list). Computer 144 may also determine the direction of trust, either one-way or two-way. In one embodiment, it may be determined based upon this information that the sender is on the recipient's white list and control moves to step 416. Or, if the sender is not on the recipient's white list, it may be determined that the message is likely spam and control moves to step 424. Or, if the nature of the trust cannot be clearly established (e.g., there is no trust relationship, there is only weak trust relationship, or there is only a one-way trust relationship) than control moves to step 420 because it cannot be determined accurately whether or not the message is spam.

In a second embodiment, the direction of the trust may be used in conjunction with the type of trust or exclusively to determine whether or not the message is spam. For example, it may be determined that a two-way trust relationship is necessary for the sender to be on the recipient's white list. Or, a one-way trust may be sufficient. In either these embodiments, the result is returned to trust network engine 190 in order to choose a path of control.

A preferred embodiment, a score-based trust relationship is determined based upon the sender's node. For example, the number of links from the sender's node, and the number of links into the sender's node are each weighted appropriately and then an algorithm is used to compute a score. Considering node 210 as an example, it has an outgoing strong trust link 211, five incoming strong trust links, and two incoming weak trust links. Considering node 280 as an example, it has a single outgoing weak trust link and a spam count of 1. A simple algorithm that may be used simply counts the number of outgoing weak trust links for a given node and uses this as a score, thus, a likely spammer will have a high number of outgoing weak trust links and a high score. Or, the spam count for a given node (the number of messages determined to the spam that have been sent from this node) is also factored into this score. Alternatively, if a node (such as node 210) has a high number of incoming strong trust links this high number may be subtracted from the total score thus providing a lower score indicating that the node is very trustworthy. Or, a node having a high number of outgoing strong trust links (or two-way trust links) may also be used to generate a lower score. In general, strong trust links, two-way trust links, a very low (or nonexistent) spam count lowers a node's score indicating that the node is very trustworthy and is not likely to send spam. On the other hand, a node with no strong trust links, a high number of outgoing weak trust links, or a high spam count will generate a higher score indicating that the node is likely to send spam.

Figure 6:
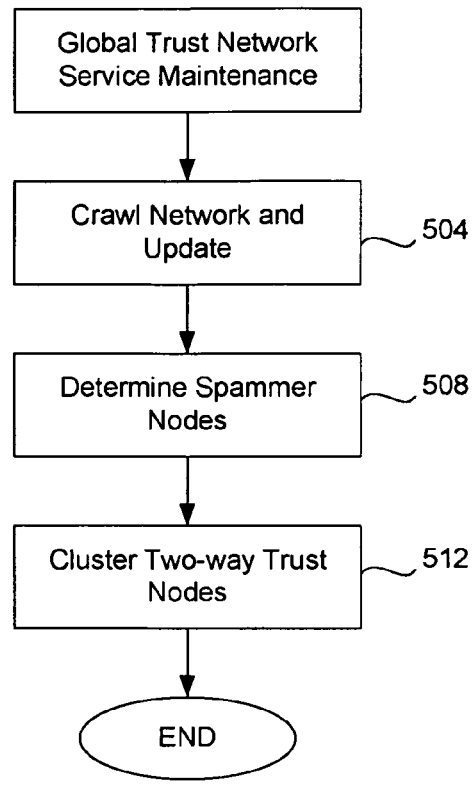
FIG. 6 is a flow diagram of global trust network service maintenance.

Another technique accesses an e-mail address blacklist or a domain name blacklist that has been created using the flow diagram of FIG. 6. If the sender e-mail address is on one of these blacklists, then the determination is automatically made that the sender is a spammer and the message is spam and the maximum high score is returned. In any case, a score is generated by computer 144 based upon information in the global trust network and the score is returned to trust network engine 190 to make a determination regarding which step (416, 420 or 424) to pursue. Any suitable algorithm may be used to determine the score. In one particular embodiment, the algorithm in Table 1 is used.

TABLE 1

$$\text{Min}\left(1, \frac{\text{Spam}_i}{\text{Threshold}} * 0.5 + \frac{\text{abs}(\text{Out}_i - \text{In}_i)}{\text{Out}_i} * 0.25 + \frac{\text{Weak}_i}{\text{Weak}_i + \text{Strong}_i} * 0.25\right)$$

Using this algorithm, a score is computed where the variable "$\text{Spam}_i$" means the spam count for the ith node. The variables "$\text{Out}_i$" and "$\text{In}_i$" refer to the number of outgoing links and incoming links for a particular node. The variables "$\text{Weak}_i$" and "$\text{Strong}_i$" refer to the number of weak links and strong links of a particular node. The value "abs(x)" refers to the absolute value of a number "x". And the value "min(x, y)" refers to the minimum number of x and y.

Considering the situation in which a low score is returned to engine 190 (or it is otherwise determined that the sender is on the white list for the recipient), it is determined in step 416 that the message is valid. Next, in step 430, engine 190 determines that the anti-spam engine 165 be bypassed and the message should be delivered directly to the recipients. This bypassing of the anti-spam engine improves mail scanning performance because the incoming message need not be scanned to determine if it is spam or not. In step 434 local network store 180 is updated with the information that an authenticated sender has sent a valid e-mail message to the recipient. For example, a strong link is added from sender to recipient in a network such as network 200. Or, a row in table 202 is created (or updated) to reflect that the sender has sent the recipient a valid message and a strong trust link is established. A field such as field 297 may also be updated to indicate the number of valid messages sent from the sender to the recipient (i.e. messages that are not spam). Next (or at any time after step 416), in step 438 the message is finally delivered from the sender to the recipient within implementation 110.

Considering the situation in which a medium score is returned (or if the sender is not on the white list), network engine 190 may determine it is not clear cut whether the message is spam or not, and may direct anti-spam engine 165 to scan the incoming message using a normal scanning algorithm in step 440. Depending upon the settings of the anti-spam engine, the message may be determined to be spam and is screened or blocked in step 450, or is determined to be valid and is delivered to the user in step 454. Depending upon the settings, spam may be: blocked, deleted, move to a spam or trash folder, delivered to the user but flagged as spam, grouped into a single message and delivered to the user, etc.

Considering the situation in which a very high score is returned and it is likely that the message is spam, in step 424 the network engine 190 directs anti-spam engine 440 to scan the message using a very aggressive algorithm or flags the message for engine 165 as being spam. In one embodiment, upon receiving the spam flag, engine 165 does not scan the message, but screens or blocks it as discussed above. Not scanning the message when it is known to be spam improves mail scanning performance. Or, the aggressive algorithm used makes a determination that the message is spam.

In any of these situations, user feedback is received at step 458. For example, if the message is determined to be spam but the recipient makes the determination that it is not spam (by viewing a spam or trash folder, by viewing a flagged message, etc.), then network engine 190 determines that in fact the message is valid and is from a legitimate sender based upon the experience of the user recipient. In step 459 then, the local store 180 is updated with the information that the sender has sent the recipient a valid message and a strong trust link is established as described above.

Alternatively, if a supposed valid message is delivered to the recipient but the recipient makes the determination that it is in fact, spam (by flagging the message, providing feedback to the e-mail program, etc.), then network engine 190 determines that the message is spam based upon the experience of the recipient. In step 459 then, the local store 180 is updated with the information that the sender has sent the recipient spam (e.g., spam count 296 is incremented, any existing trust may be deleted, etc.). In this fashion, the nature of the message sent from sender to recipient (and the type of trust or spam, if any) is recorded for each such message in local network store 180 which is later used to update the global trust network as described in step 324. Thus, any number of implementations 110 (whether on a standalone computer or within an enterprise environment) can periodically update global trust network 148 with information gleaned from all e-mail messages received.

In an alternative embodiment, if a local store is not used, then in steps 434 and 459 the sender-recipient information and links are updated by sending the information over a telecommunications network to a remote global trust network 148.

Global Trust Network Service

The global trust network service 140 (comprising at least computer 144 and global trust network 148) performs numerous backend maintenance tasks in addition to responding to queries from check module 160. In step 504 the service periodically crawls through the global trust network and updates the network by removing nodes that are not in use. It is known that spammers often use new addresses from which to send spam; removing these nodes (and addresses) from the network will free up memory space. When a particular sender-recipient pair is recorded in local store 180 (or is checked using check module 160) a timestamp field (such as may be stored in field 297) is added to the sender node indicating the day on which the message was sent. Upon crawling the network, the service may flag nodes that have not changed or been updated (i.e., no messages have been sent from that node) after a period of time. At that time (or at a set time thereafter), the service may delete these nodes (and their corresponding links or entries in a node table) in order to free up memory space.

Additionally, in step 508 the service periodically crawls through the network and determines which nodes are spammers. This determination may be performed by counting the number of outgoing weak trust links (a high number of sent messages that are not authenticated indicate spam), by counting the number of incoming links (a node with no incoming messages that it is not trusted by anyone is possibly a spammer), by looking at the spam count 296 for each node, or by looking at other factors for each node.

Once a node has been determined to be a spammer, these nodes are categorized and a blacklist may be formed based upon this information. A blacklist is simply a list of those nodes of the global trust network (or more specifically, the e-mail addresses associated with those nodes) that have been determined to be spammers. Should a particular domain have an inordinate number of spam e-mail addresses, that domain may also be added to a blacklist of domain names. Once a particular domain has been blacklisted, the nodes and e-mail addresses of that domain may be removed from the trust network and the blacklist will then be relied upon for determining if a particular sender e-mail address is sending spam or not.

Figure 7:
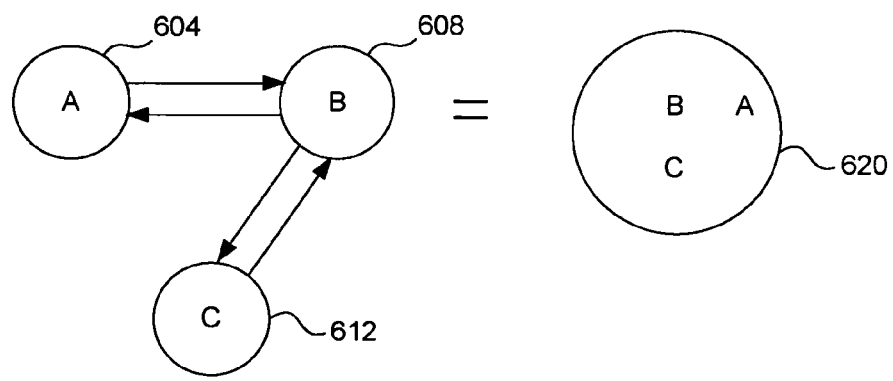
FIG. 7 is a diagram showing node clustering.

Further, in step 512 the service may cluster together any number of two-way trust nodes into a single node to further reduce memory and to increase efficiency of the network. For example, consider the nodes of FIG. 7. Shown are nodes 604, 608 and 612. Nodes 604 and 608 have a strong two-way trust relationship and nodes 608 and 612 also have a strong two-way trust relationship. It can thus be determined that all of these nodes trust each other, and an equivalent representation will be a single node 620 that represents each of these three parties (i.e., each of their respective e-mail addresses). The service crawls through the network determining groups of nodes that may be clustered together in this manner. For example, nodes 210, 220 and 250 may be clustered together into a single node. In an alternative embodiment, a two-way trust relationship would not necessarily be required in order to group nodes together into a single node. For example, consider the example in which node 604 trusts node 608, and node 608 trusts node 612 (each trust being a strong trust). On the basis of these trusts, it may be inferred that node 612 would also trust node 604 (and vice versa), and therefore these nodes should be grouped together into node 620. Of course, any indication that a node is a spammer such as any spam count, a large number of outgoing weak trust links, or a determination that a node is a spammer, would dictate that the given node not be clustered together with other nodes that trust each other.

Likely Spammer Attacks

Above, it has been discussed how a spammer may send an e-mail message by faking the name of the sender and how the system guards against this type of attack. It also been discussed how the system can guard against a spammer making use of the auto reply feature in order to be considered a trusted node. Another type of attack involves the spammer using a robot network (or "botnet") to send normal, authenticated messages to a spammer e-mail address, in order to suggest that the spammer e-mail address is a trusted party or to add the spammer e-mail address to a white list for the sending parties. As is known, a robot network might enlist computers of unsuspecting users to send mass messages. By sending these messages from unsuspecting, normal users to a spammer's e-mail address, the spammer is attempting to suggest that the spammer e-mail address is a trusted party. The service can counter this threat by crawling the global network to determine if a high number of different, legitimate e-mail addresses are sending messages to the same account (i.e., the spammer's e-mail address), and then taking an action to flag that account as a likely spammer.

Volume Analysis

The present invention has the capability to scale dramatically and be able to handle e-mail messages on a global scale. For example, first considering only normal e-mail traffic, assume that each person on earth has 10 active, legitimate e-mail accounts, then there will be approximately 6 billion*10=60 billion active e-mail accounts. These are the accounts for which white lists need to be built. Assuming that each person has approximately 50-100 friends that they contact frequently via e-mail, then it can be assumed that each node in the global trust network will have 50 degrees of incoming trust and outgoing trust (i.e., 50 incoming links and 50 outgoing links).

Thus, then the total maximum volume for normal e-mail traffic will be 60 billion*100=6,000 G. A member of this size is reasonable for an in-the-cloud service, such as network service 140, and therefore it is possible to build a white list for the entire world.

Large storage is required for the spammer's e-mail accounts. These accounts are not stable and change frequently. The maintenance steps of FIG. 6 discuss techniques for performing maintenance of the network, updating nodes, deleting nodes, and clustering nodes which will free up memory space, improve efficiency, and remove nodes not in use.

Computer System Embodiment

Figure 8A:
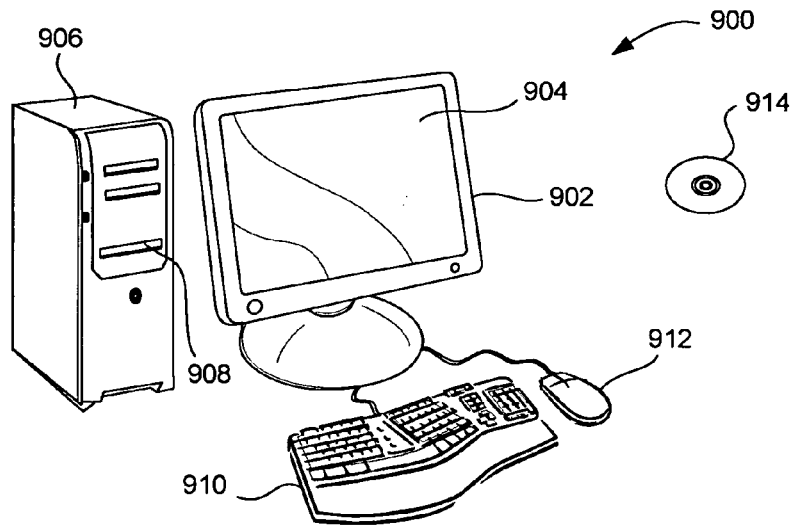
FIGS. 8A and 8B illustrate a computer system suitable for implementing embodiments of the present invention.
Figure 8B:
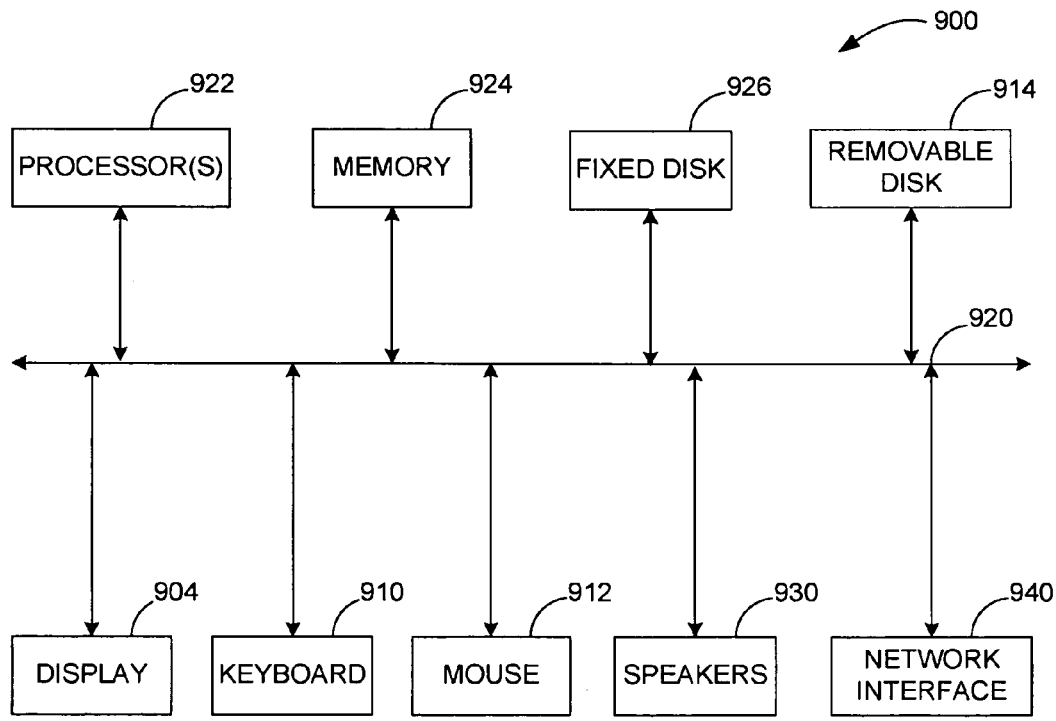

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of determining whether an e-mail message is spam, said method comprising:
   receiving at a computer an e-mail message from a sender having a sender e-mail address that is addressed to a recipient at a recipient e-mail address;
   determining that said sender is a legitimate sender;
   sending said sender e-mail address and said recipient e-mail address over a telecommunications network to a trust network service that maintains a trust network database, said trust network database including a plurality of user identifiers and trust links, each trust link indicating that an e-mail message has been sent between pairs of users identified by said user identifiers;
   accessing said trust network database by said service to identify a first user identifier that matches said sender e-mail address and a second user identifier that matches said recipient e-mail address;
   determining that a trust link exists between said first user identifier and said second user identifier;
   updating said trust network database to reflect that said trust link is a strong trust link;
   determining a spam indicator based upon the existence of said trust link between said first user identifier and said second user identifier;
   sending said spam indicator back over said telecommunications network to said computer; and
   determining whether or not to deliver said e-mail message to said recipient as a valid e-mail message based upon said spam indicator.

2. A method as recited in claim 1 wherein said spam indicator is based upon the number of outgoing trust links from said user identifier that matches said sender e-mail address.

3. A method as recited in claim 1 wherein said computer includes an anti-spam engine that normally scans all incoming e-mail messages, said method further comprising:

determining that said e-mail message is a valid message; and delivering said e-mail message to said recipient without having said e-mail message scanned by said anti-spam engine.

4. A method as recited in claim 1 wherein said spam indicator is a score that ranges from a first value indicating that said e-mail message is spam to a second value indicating that said e-mail message is not spam.

5. A method as recited in claim 1 further comprising:
authenticating said sender e-mail address to determine that said sender e-mail address is legitimate before said step of sending said sender e-mail address.

6. A method as recited in claim 1 further comprising:
updating a local trust network database with said sender e-mail address and said recipient e-mail address, said local trust network database including a plurality of user identifiers linked by trust links that indicate an e-mail message sent between pairs of users.

7. A method as recited in claim 1 wherein said trust link indicates that said sender is on a white list of said recipient, said white list being unique to said recipient.

8. A method as recited in claim 7 wherein said sender being on said white list for said recipient indicates that said sender is permitted to send electronic mail to said recipient, but does not indicate that said sender is permitted to send electronic mail to other users.

9. A method of creating a sender-recipient trust network, said method comprising:
determining at a computer that a sender having a sender e-mail address has chosen to send an outgoing e-mail message to a recipient having a recipient e-mail address;
making a determination that said sender trusts said recipient based upon said determining, said making a determination occurring before said e-mail message is sent;
sending said sender e-mail address and said recipient e-mail address to a trust network database, said trust network database including a plurality of user identifiers linked by trust links, each trust link indicating that an e-mail message has been sent between pairs of users identified by said user identifiers;
updating said trust network database to include user identifiers each corresponding to said sender e-mail address and to said recipient e-mail address; and
updating said trust network database to include a trust link from said sender user identifier to said recipient user identifier.

10. A method as recited in claim 9 further comprising:
sending said sender and recipient e-mail addresses over a telecommunications network to a remote trust network service that maintains said trust network database, said trust network database being accessible by entities other than an entity that controls said computer.

11. A method as recited in claim 9 wherein said trust network database is a local trust network database, said method further comprising:
sending said sender and recipient e-mail addresses to said local trust network database, said local trust network database only being accessible by users acting within the control of an entity that controls said computer.

12. A method as recited in claim 11 further comprising:
sending data within said local trust network database over a telecommunications network to a remote trust network service that maintains a global trust network database; and
updating said global trust network database with said data from said local trust network database.

13. A method as recited in claim 11 further comprising:
determining that said sender is a legitimate sender; and
updating said trust network database to reflect that said trust link is a strong trust link.

14. A method as recited in claim 9 wherein said making a determination that said sender trusts said recipient is only based upon said outgoing message being addressed to said recipient.

15. A method as recited in claim 9 wherein inclusion of said trust link operates to add said recipient to a white list of said sender, said white list being unique to said sender.

16. A method as recited in claim 15 wherein said recipient being on said white list for said sender indicates that said recipient is permitted to send electronic mail to said sender, but does not indicate that said recipient is permitted to send electronic mail to other users.

17. A method of creating a sender-recipient trust network, said method comprising:
receiving at a computer an incoming e-mail message from a sender having a sender e-mail address that is addressed to a recipient at a recipient e-mail address;
authenticating that said sender e-mail address is a legitimate e-mail address;
determining that said sender is a legitimate sender;
determining that said sender e-mail address is on a recipient white list for said recipient, said recipient white list being unique to said recipient;
sending said sender e-mail address and said recipient e-mail address to a trust network database, said trust network database including a plurality of user identifiers linked by trust links, each trust link indicating that an e-mail message has been sent between pairs of users identified by said user identifiers;
updating said trust network database to include user identifiers each corresponding to said sender e-mail address and to said recipient e-mail address;
updating said trust network database to include a trust link from said sender user identifier to said recipient user identifier; and
updating said trust network database to reflect that said trust link is a strong trust link.

18. A method as recited in claim 17 wherein said step of determining further includes:
accessing a remote global trust network database over a telecommunications network using said sender and recipient e-mail addresses to determine that a trust link exists from said recipient to said sender.

19. A method as recited in claim 17 wherein said step of determining further includes:
accessing a remote global trust network database over a telecommunications network using at least said sender e-mail address to determine that said incoming e-mail message is not spam.

20. A method as recited in claim 17 wherein said computer includes an anti-spam engine that normally scans all incoming e-mail messages, said method further comprising:
delivering said incoming e-mail message to said recipient without having said e-mail message scanned by said anti-spam engine.

21. A method as recited in claim 17 further comprising:
sending said sender and recipient e-mail addresses over a telecommunications network to a remote trust network service that maintains said trust network database, said trust network database being accessible by entities other than an entity that controls said computer.

22. A method as recited in claim 17 wherein said trust network database is a local trust network database, said method further comprising:

sending said sender and recipient e-mail addresses to said local trust network database, said local trust network database only being accessible by users acting within the control of an entity that controls said computer.

23. A method as recited in claim 22 further comprising:

sending data within said local trust network database over a telecommunications network to a remote trust network service that maintains a global trust network database; and updating said global trust network database with said data from said local trust network database.

24. A method as recited in claim 17 wherein said sender e-mail address being on said white list for said recipient indicates that said sender is permitted to send electronic mail to said recipient, but does not indicate that said sender is permitted to send electronic mail to other users.

25. A method as recited in claim 17 wherein inclusion of said trust link operates to add said recipient to a sender white list of said sender, said sender white list being unique to said sender.

26. A method as recited in claim 25 wherein said recipient being on said white list for said sender indicates that said recipient is permitted to send electronic mail to said sender, but does not indicate that said recipient is permitted to send electronic mail to other users.

* * * * *